United States Patent [19]

Scheineson et al.

[11] Patent Number: 5,037,455
[45] Date of Patent: Aug. 6, 1991

[54] AIR FILTER

[75] Inventors: Irwin B. Scheineson, Cincinnati; Jerry A. Govert, Terrace Park, both of Ohio

[73] Assignee: The Great American Filter Company, Cincinnati, Ohio

[21] Appl. No.: 582,075

[22] Filed: Sep. 14, 1990

[51] Int. Cl.⁵ .......................... B01D 46/00; B03C 3/02
[52] U.S. Cl. ........................................ 55/103; 55/486; 55/485; 55/487; 55/528; 55/DIG. 31
[58] Field of Search ................. 55/103, 155, 485, 486, 55/487, 528, DIG. 31

[56] References Cited

U.S. PATENT DOCUMENTS

| | | |
|---|---|---|
| 2,612,966 | 10/1952 | Nicol . |
| 2,724,457 | 11/1955 | Besser . |
| 2,804,937 | 9/1957 | Poole . |
| 2,809,715 | 10/1957 | Lemkey . |
| 3,237,387 | 3/1966 | Haugen et al. . |
| 3,563,828 | 2/1971 | Marshall . |
| 3,763,633 | 10/1973 | Soltis . |
| 4,115,082 | 9/1978 | Newell . |
| 4,129,430 | 12/1978 | Snow . |
| 4,133,653 | 1/1979 | Soltis . |
| 4,340,402 | 7/1982 | Catron . |
| 4,518,402 | 5/1985 | Dargel . |
| 4,631,077 | 12/1986 | Spicer et al. . |
| 4,886,526 | 12/1989 | Joannou . |
| 4,902,306 | 2/1990 | Burnett et al. . |
| 4,904,288 | 2/1990 | d'Augereau . |

FOREIGN PATENT DOCUMENTS 3802748 8/1989 Fed. Rep. of Germany .
2384532 10/1978 France .

Primary Examiner—Charles Hart
Attorney, Agent, or Firm—Finnegan, Henderson, Farabow, Garrett & Dunner

[57] ABSTRACT

An air filter assembly includes three layers of alternating layers of woven polypropylene and polyurethane sandwiched together in a removable plastic frame. The polypropylene layers are woven in a honeycomb pattern. Each successive layer acquires an opposite electrostatic charge. The air filter assembly mechanically and electrostatically filters dust from air.

15 Claims, 4 Drawing Sheets

AIR FILTER

BACKGROUND OF THE INVENTION

1. Field of the Invention

The present invention relates to an air filter, and more specifically to an air filter assembly for both mechanically and electrostatically filtering dust and other particulate matter from air.

2. Description of the Related Art

For a variety of health and cleanliness reasons, it is desirable to filter dust, pollen, and other particulate matter from air in residential and commercial buildings. This is commonly done by flowing air in a ventilation system through a filter assembly. Dust is removed mechanically or electrostatically by the filter.

Conventional air filters are either expensive or inefficient at removing dust from air. Disposable fiberglass or polypropylene air filters act to mechanically filter only a fraction of the amount of dust in the air of a building. In some instances, the filters include a resinous dust-retentive coating. However, dust still remains in the air after using such coated filters.

To improve filtering effectiveness, filters have been developed which perform both mechanical and electrostatic filtering. In an electrostatic filter assembly, a filter layer may include a pair of metallic grids, to which opposite electrostatic changes are applied by an external voltage source. Dust particles acquire the electrostatic charge of the first grid and adhere to the second oppositely-charged grid. This type of air filter is more effective than the simple mechanical filter. However, the electric components and the need for an external voltage source substantially increase the complexity and cost of the filter.

Other arrangements have been developed which filter air both mechanically and electrostatically without the application of electricity from an external source. However, such arrangements have been expensive to produce and have other shortcomings as well.

SUMMARY OF THE INVENTION

It is an object of the present invention to provide a highly effective and efficient air filter assembly which removes dust and particulate matter from air both mechanically and electrostatically.

It is also an object of the present invention to provide an air filter assembly which does not have a large pressure drop across the assembly resulting from excessive resistance to air flow.

It is a another object of the present invention to provide an air filter assembly which is reusable, portable, and easy to clean and install.

It is a further object of the present invention to provide an air filter assembly which is relatively inexpensive to manufacture and can be sold inexpensively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, an air filter is provided which includes a first filter layer formed of a first plastic material having a surface. A second filter layer is formed of a second plastic material having opposite first and second surfaces, with the first surface abutting the surface of the first filter layer.

A third filter layer is formed of the first plastic material and has opposite first and second surfaces, with the first surface abutting the second surface of the second filter layer.

A fourth filter layer is formed of the second plastic material and has opposite first and second surfaces, the first surface abutting the second surface of the third filter layer. A fifth filter layer is formed of the first plastic material and has a surface abutting the second surface of the fourth filter layer.

Means are provided for maintaining the first, second, third, fourth, and fifth filters layers in the abutting relationship, and for permitting slidable frictional movement between the first, second, third, fourth, and fifth filter layers to create an opposite electrostatic charge on each successive abutting layer.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

In accordance with the present invention, there is provided an air filter assembly with a first filter layer, formed of a first plastic material. As embodied in FIG. 1, first filter layer 10 of air filter 8 includes a surface 12.

Preferably, first filter layer 10 is formed of polypropylene. As shown in FIGS. 2A-2E, first filter layer 10 is woven of a plurality of polypropylene fibers. The woven polypropylene layer is single ply, having 30 strands per inch in both the warp and fill directions, and a weight of 5.1 ounces per square yard. The weave pattern depicted in FIGS. 2A-2E is well known in the textile art and is generally referred to as a "honeycomb." In the honeycomb weave, the polypropylene fibers (designated numerically in the warp direction and alphabetically in the fill direction) are alternately spaced and bunched. Moreover, the fibers are interlaced to form a pattern similar to a honeycomb. The polypropylene fibers have a diameter of 12 mil, a tensile strength of 200 psi, and a tear strength of 80 psi. An acceptable woven polypropylene layer for use as first filter layer 10 is manufactured by Chicopee Manufacturing Co., filter model 6025900. In an alternate embodiment, the fibers may be coated with a special formulation in order to enhance electrostatic capabilities.

Figure 1:
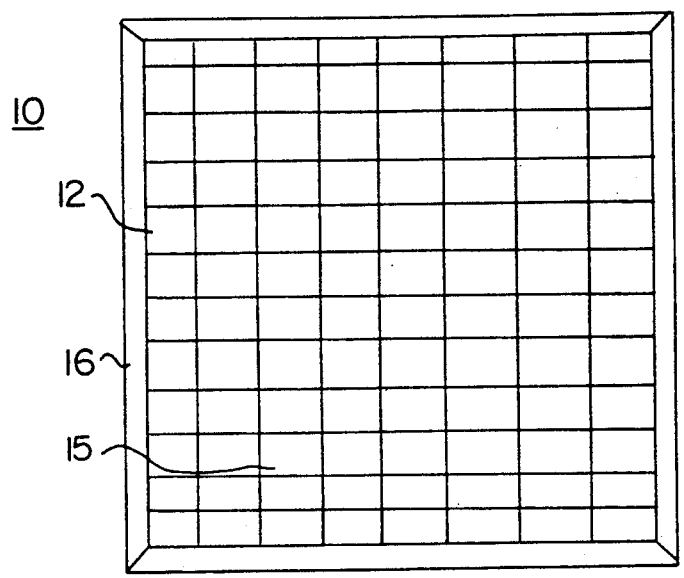
FIG. 1 is a plan view depicting a first layer of an air filter assembly according to the present invention.

Referring to FIG. 1, woven first filter layer 10 defines a plurality of openings 15 in the layer.

As embodied herein, first layer 10 also includes means for providing peripheral support. The support means includes a support frame. As embodied in FIG. 1, a rigid support frame 16 surrounds the periphery of first filter layer 10. First filter layer 10 is thus rigid and relatively inflexible. Preferably, support frame 16 is a galvanized steel material.

Figure 3:
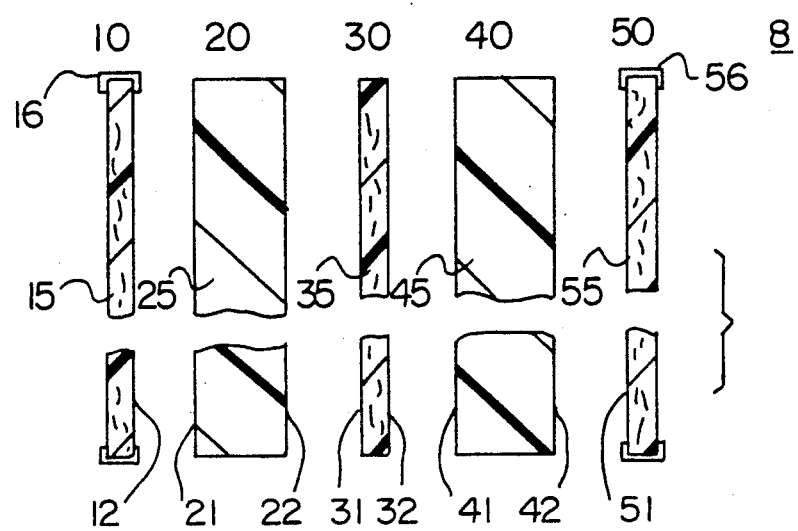
FIG. 3 is an exploded side view of a plurality of layers for an air filter assembly according to the present invention.

In accordance with the invention, there is provided a second filter layer, formed of a second plastic material. Referring now to FIG. 3, and as broadly embodied herein, second filter layer 20 includes a first surface 21 and a second surface 22.

Preferably, second filter layer 20 is formed of polyurethane. The polyurethane layer is preferably ¼ inch thick, plus or minus 1/16 inch. The polyurethane layer preferably has a density of 1.4 pounds per cubic foot, a tensile strength of 22 psi, tear strength of 4.5 psi, elongation ratio of 200%, compression ratio of 20%, and is extremely flexible. An acceptable polyurethane layer is manufactured by Crest Foam Corp., under the trade name FILTER CREST, model number T-30.

Preferably, polyurethane second filter layer 20 defines a plurality of pores 25. Pores 25 exist in the second layer, having a pore count of between twenty-five and thirty-five pores per inch.

In accordance with the invention, there is provided a third filter layer, formed of the first plastic material. As embodied in FIG. 3, third filter layer 30 includes a first surface 31 and a second surface 32.

Preferably, third filter layer 30 is substantially identical to first filter layer 10 depicted in FIGS. 1 and 2, being a single-ply woven polypropylene layer, woven in the honeycomb weave pattern described, and defining a plurality of openings 35. Third filter layer 30 differs from first filter layer 10 only in that it includes no support frame attached to its periphery. Consequently, third filter layer 30 is extremely flexible.

In accordance with the invention, there is provided a fourth filter layer, formed of the second plastic material. As embodied in FIG. 3, fourth filter layer 40 includes a first surface 41 and a second surface 42.

Preferably, fourth filter layer 40 is identical to second filter layer 20, being a ¼ inch thick polyurethane layer defining a plurality of pores 45 in a pore count of twenty-five to thirty-five pores per inch.

In accordance with the invention, there is provided a fifth filter layer, formed of the first plastic material. As embodied in FIG. 3, fifth filter layer 50 includes a surface of 51.

Preferably, fifth filter layer 50 is identical to first filter layer 10 depicted in FIGS. 1 and 2. As embodied herein, fifth filter layer 50 is a single-ply woven polypropylene layer, having the honeycomb weave pattern described, and defining a plurality of openings 55. A rigid support frame 56 surrounds the periphery of fifth filter layer 50.

Figure 4:
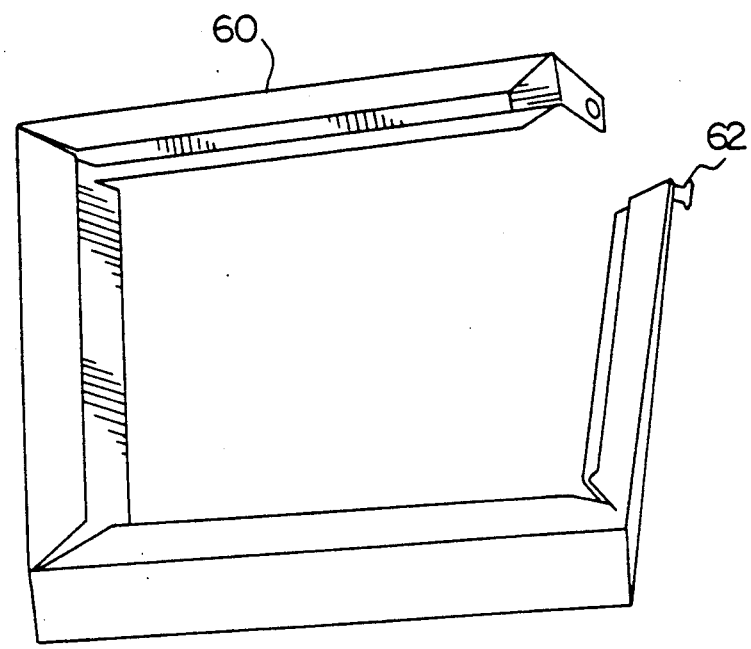
FIG. 4 is a perspective view of the frame means for framing the outer periphery of the layers depicted in FIG. 3.

In accordance with the invention, there is provided means for maintaining the filter layers in abutting relationship. Such means preferably includes frame means for framing an outer periphery of the first, second, third, fourth, and fifth filter layers. The frame means may include a rectangular frame having a U-shaped cross-section. As embodied in FIG. 4, U-shaped frame 60 is preferably formed of 0.055 inch thick (±0.01 inches) polyvinyl chloride. Frame 60 is relatively flexible, and includes closure means such as a side which can be opened or closed by fastening or unfastening screw or clip 62.

Figure 5:
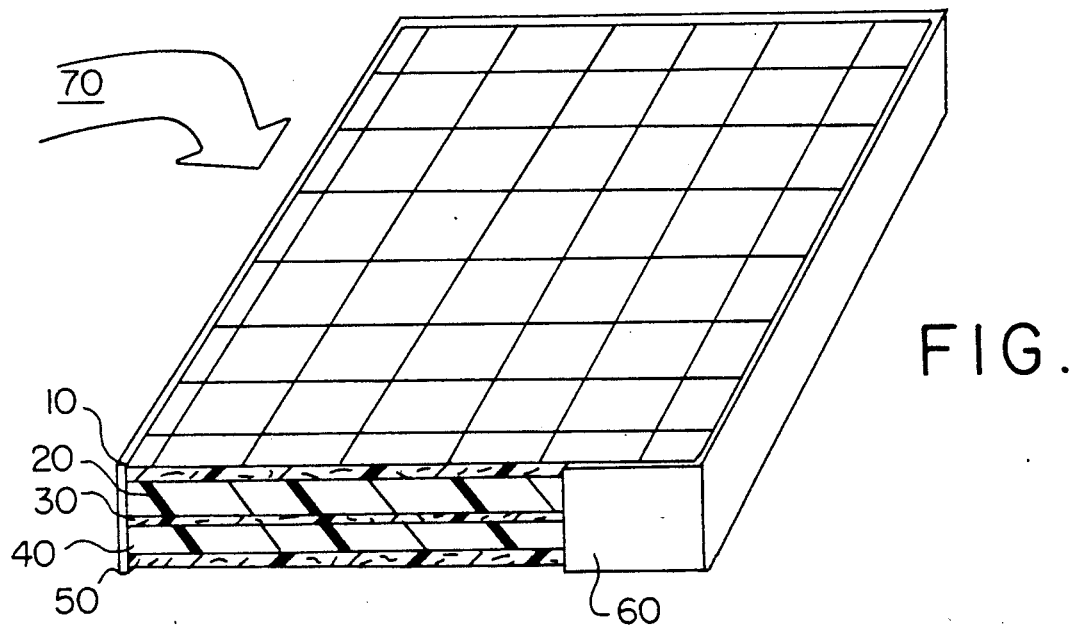
FIG. 5 is a perspective view of an air filter assembly according to the present invention, having a portion of the frame means of FIG. 4 cutaway to show the layers of FIG. 2 mounted in abutting relationship.
Figure 2A:
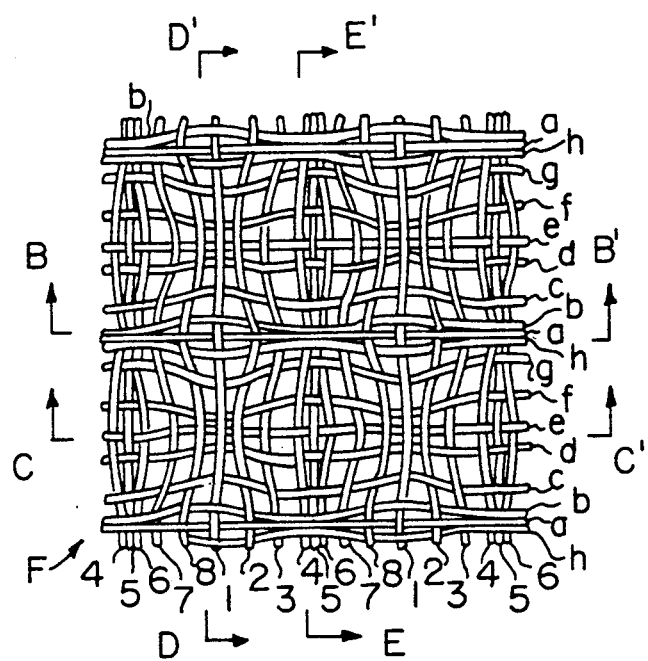
FIG. 2A is a detailed plan view of the weave used in the layer depicted in FIG. 1.
Figure 2B:
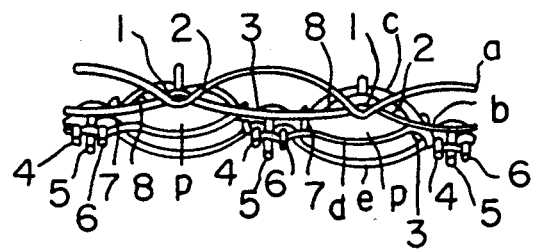
FIG. 2B is a cross-section view of the weave of FIG. 2A taken along line B—B'.
Figure 2C:
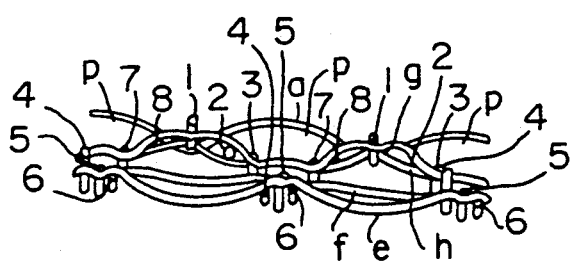
FIG. 2C is a cross-section view of the weave of FIG. 2A taken along line C—C'.
Figure 2D:
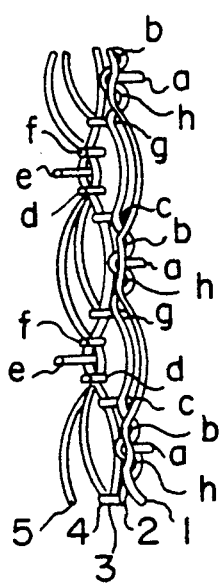
FIG. 2D is a cross-section view of the weave of FIG. 2A taken along line D—D'.
Figure 2E:
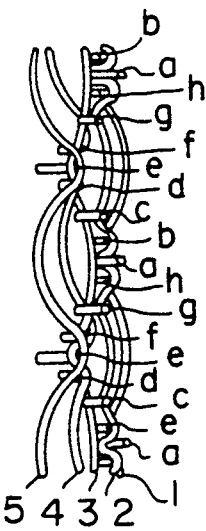
FIG. 2E is a cross-section view of the weave of FIG. 2A taken along line E—E'.

Referring now to FIG. 5, and in accordance with the invention, frame 60 functions to mount the first through fifth filter layers together in the following configuration. First filter layer 10 is disposed outermost in the U-shaped channel defined by frame 60. Second filter layer 20 is mounted with first surface 21 abutting surface 12 of first filter layer 10. Third filter layer 30 is mounted with first surface 31 abutting second surface 22 of second filter layer 20. Fourth filter layer 40 is mounted with first surface 41 abutting second surface 32 of third filter layer 30. Fifth filter layer 50 is mounted with surface 51 abutting second surface 42 of fourth filter layer 40.

Clip 62 is fastened, fully closing the frame 60 around the periphery of the filter layers. Rigid frames 16 and 56 provide support to first and fifth filter layers 10, 50, providing them with rigidity and preventing them from slipping out of frame 60. Structural integrity is thereby maintained.

The overall thickness of the resultant air filter assembly 8 is approximately one inch.

Because of the flexibility of frame 60, the first, second third, fourth, and fifth layers can shift slightly within frame 60 transverse to one another. Frictional contact is thereby provided, as each separate layer rubs against the abutting layers.

The density of the honeycomb weave of the polypropylene layers 10, 30, 50, the pore density of the polyurethane layers 20, 40, and the disposition of the various layers within frame 60 is such that openings 15, 25, 35, 45, 55 in any three successive layers are generally unaligned. Thus, there is no straight unimpeded path for the flow of air and dust through the five filter layers. This lack of an unimpeded flow path provides the air filter assembly with a mechanical filtering capability.

In operation, air and entrained particulate is passed through filter assembly 8, for example in the ventilation system of a residential or office building. This flow is depicted generally by reference numeral 70 in FIG. 5. As air passes across and through filter 8, layers 10, 20, 30, 40, and 50 rub against one another. The frictional contact of the layers creates an electrostatic charge on each layer. Due to the different characteristics associated with the different plastic material comprising each successive layer, this electrostatic charge is opposite on each successive layer. Generally, polypropylene layers 10, 30, 50 acquire a negative (−) electrostatic charge. Polyurethane layers 20, 40 generally acquire a positive (+) electrostatic charge.

As dust particles and other particulate matter flow with the air through air filter assembly 8, they become polarized due to contact with negatively-charged first layer 10. The dust particles tend to acquire a (+) charge on one end, and a (−) charge on the opposite end. The polarized dust particles are then attracted and acquired by the positively charged second layer 20. Any dust particles which are not acquired by second layer 20 may also be acquired by layers 30, 40, 50 due to the electrostatic charges existing on each layer. Dust particles and other particulate matter are thus electrostatically filtered from the air.

The electrostatic charges developed in the various layers are protected from being neutralized or grounded, even in a metallic environment such as a ventilation system. Plastic frame 60 successfully isolates the filter layers from their surroundings, thereby maintaining the (+) and (−) electrostatic charges on each layer.

Dust particles are simultaneously mechanically filtered in air filter assembly 8. Due to the lack of alignment of openings 15, 35, 55 and pores 25, 45, no straight paths are provided for flow of dust-entrained air 70. The continuous changes of direction by the air stream through layers 10, 20, 30, 40, 50 causes dust particles to become lodged in the openings and pores of successive layers.

Following the above described operation, air filter assembly 8 can be completely cleaned and restored. Frame 60 can be opened by unfastening clip 62, and removed from the periphery of the layers. Filter layers 10, 20, 30, 40, 50 can be independently cleaned by any conventional method, removing entrapped dust and particulate. The air filter assembly 8 can then be easily reassembled.

Additional advantages and modifications will readily occur to those skilled in the art. The invention in its broader aspects is, therefore, not limited to the specific details, representative apparatus, and illustrative example shown and described. Accordingly, departures may be made from such details without departing from the spirit or scope of the applicant's general inventive concept.

What is claimed is:

1. An air filter assembly, comprising:
   a first filter layer formed of a first plastic material having a surface;
   a second filter layer formed of a second plastic material having opposite first and second surfaces, said first surface abutting said surface of said first filter layer;
   a third filter layer formed of said first plastic material having opposite first and second surfaces, said first surface abutting said second surface of said second filter layer;
   a fourth filter layer formed of said second plastic material having opposite first and second surfaces, said first surface abutting said second surface of said third filter layer;
   a fifth filter layer formed of said first plastic material having a surface abutting said second surface of said fourth filter layer; and
   means for maintaining said first, second, third, fourth, and fifth filter layers in said abutting relationship, and for permitting slidable frictional movement between said first, second, third, fourth, and fifth filter layers to create an opposite electrostatic charge on each successive abutting layer.

2. An air filter assembly according to claim 1, wherein said first, third, and fifth filter layers are formed of polypropylene.

3. An air filter assembly according to claim 2, wherein said polypropylene layer includes woven polypropylene fibers.

4. An air filter assembly according to claim 3, wherein the woven fibers define a weave having a honeycomb pattern.

5. An air filter assembly according to claim 4, wherein the weave has approximately 30 strands per inch in each direction.

6. An air filter assembly according to claim 1, wherein said second and fourth layers are formed of polyurethane.

7. Air air filter assembly according to claim 6, wherein said polyurethane layers define a plurality of pores having a density of between 25 and 35 pores per inch.

8. An air filter assembly according to claim 1, wherein each said filter layer defines a plurality of openings, said openings in one layer are generally unaligned with said openings in the abutting layer.

9. An air filter assembly according to claim 1, wherein the maintaining means includes frame means for framing an outer periphery of said first, second, third, fourth, and fifth filters layers.

10. An air filter assembly according to claim 9, wherein said frame means includes closure means for permitting removal and replacement of the filter layers.

11. An air filter assembly according to claim 1, wherein said first and fifth filter layers each include means for providing peripheral support for those layers.

12. An air filter assembly, comprising:
    a first filter layer electrostatically chargeable to a first relative polarity;
    a second filter layer electrostatically chargeable to a second relative polarity when frictionally contacting the first filter layer;
    a third filter layer electrostatically chargeable to a third relative polarity when frictionally contacting the second filter layer;
    a fourth filter layer electrostatically chargeable to a fourth relative polarity when frictionally contacting the third filter layer;
    a fifth filter layer electrostatically chargeable to a fifth relative polarity when frictionally contacting the fourth filter layer; and
    means for maintaining said first, second, third, fourth, and fifth filter layers in a stacked arrangement and for permitting slidable frictional movement between said first, second, third, fourth, and fifth filter layers to create an opposite electrostatic charge on each successive abutting layer.

13. An air filter assembly having five filter layers, comprising:
    a first filter layer electrostatically chargeable to a first relative polarity for charging dust particles to the first relative polarity while passing through the first filter layer;
    a second filter layer electrostatically chargeable to a second relative polarity when frictionally contacting the first filter layer for attracting and holding dust particles passing through the first filter layer having the first relative polarity;
    a third filter layer electrostatically chargeable to a third relative polarity when frictionally contacting the second filter layer for recharging dust particles which pass through the second layer to a third relative polarity;

a fourth filter layer electrostatically chargeable to a fourth relative polarity when frictionally contacting the third filter layer for attracting and holding dust particles passing through the third filter layer having the third relative polarity;

a fifth filter layer electrostatically chargeable to a fifth relative polarity when frictionally contacting the fourth filter layer; and means for maintaining said first, second, third, fourth, and fifth filter layers in a stacked arrangement and for permitting slidable frictional movement between said first, second, third, fourth, and fifth filter layers to create an opposite electrostatic charge on each successive abutting layer.

14. An air filter assembly, comprising:

a first filter layer of woven polypropylene fibers electrostatically chargeable to a first polarity;

a second filter layer of porous polyurethane electrostatically chargeable to a second polarity opposite the first polarity when frictionally contacting the first filter layer;

a third filter layer of woven polypropylene fibers electrostatically chargeable to a third polarity opposite the first polarity when frictionally contacting the second filter layer;

a fourth filter layer of porous polyurethane electrostatically chargeable to a fourth polarity opposite the first polarity when frictionally contacting the third filter layer;

a fifth filter layer of woven polypropylene fibers electrostatically chargeable to a fifth polarity opposite the first polarity when frictionally contacting the fourth filter layer; and means for maintaining said first, second, third, fourth, and fifth filter layers in a stacked arrangement and for permitting slidable frictional movement between said first, second, third, fourth, and fifth filter layers to change each successive filter layer to said respective first, second, third, fourth and fifth polarities.

15. An air filter for filtering dust particles from air comprising:

a central electrostatically chargeable filter layer of fibers woven in a honeycomb pattern forming an array of pockets with edges that define the outermost portion of both sides of the layer;

a pair of electrostatically chargeable filter layers of porous foam sandwiching the central layer, the foam layers contacting the edges of the pockets in the central layer and spaced from the pockets of the central layer to form porous chambers from the pockets on both sides of the central layer, the porous chambers having a fibrous wall portion and a foam wall portion;

an outer pair of electrostatically chargeable filter layers of fibers woven in a honeycomb pattern forming pockets with edges that define the outermost portion of the sides of the layers sandwiching the porous foam layers, the pocket edges of the outer pair of layers contacting the foam layers and the pockets of the outer layers spaced from the foam layers to define porous chambers having a fibrous wall portion and a foam wall portion; and means for maintaining said filter layers in a stacked arrangement and for permitting slidable frictional movement between said filter layers to create an opposite electrostatic charge on each successive abutting layer so that the fibrous and foam wall portions of the porous chambers have opposite electrostatic charges and form bipolar chambers, to polarize the dust particles flowing through the layers to become positively charged on one side and negatively charged on the other side, and to allow the bipolar dust particles to become electrostatically trapped within the bipolar chambers.

* * * * *